United States Patent [19]

Chan et al.

[11] Patent Number: 5,179,172
[45] Date of Patent: Jan. 12, 1993

[54] EPICHLOROHYDRIN OR CHLORINE-CONTAINING VINYL OR ACRYLATE (CO)POLYMER-MODIFIED AMINES

[75] Inventors: Richard M. Chan, Fremont; Ta Y. Ching, Novato, both of Calif.; Ta-Wang Lai, Taipei, Taiwan

[73] Assignee: Henkel Research Corporation, Santa Rosa, Calif.

[21] Appl. No.: 616,471

[22] Filed: Nov. 21, 1990

Related U.S. Application Data

[63] Continuation-in-part of Ser. No. 316,215, Feb. 27, 1989, abandoned, which is a continuation-in-part of Ser. No. 254,520, Oct. 6, 1988, abandoned.

[51] Int. Cl.⁵ .................. C08G 65/24; C08F 8/30; C08L 33/14; C08L 63/02
[52] U.S. Cl. .................. 525/328.9; 525/113; 525/194; 525/208; 525/403; 525/407; 525/410; 525/330.5
[58] Field of Search .......... 525/113, 328.9, 329.5, 525/330.5, 331.3, 375, 380, 403, 407, 410, 194, 208; 528/103, 111, 117, 341, 361, 393, 405, 407

[56] References Cited

U.S. PATENT DOCUMENTS

| | | | |
|---|---|---|---|
| 3,844,985 | 10/1974 | Fukutani et al. | 525/328.9 |
| 3,895,207 | 7/1975 | Heywang et al. | 219/68 |
| 3,895,208 | 7/1975 | Kraus | 219/68 |
| 3,988,219 | 10/1976 | Rosenberg | 528/405 |
| 4,057,554 | 11/1977 | Redmore et al. | 528/405 |
| 4,066,625 | 1/1978 | Bolger | 260/59 R |
| 4,349,651 | 9/1982 | Smith | 526/263 |
| 4,358,571 | 11/1982 | Kaufman et al. | 525/524 |
| 4,420,605 | 12/1983 | Kaufman | 528/94 |
| 4,430,445 | 2/1984 | Miyake et al. | 521/38 |
| 4,654,407 | 3/1987 | Domeier | 526/262 |

FOREIGN PATENT DOCUMENTS

| | | |
|---|---|---|
| 24119 | 2/1981 | European Pat. Off. . |
| 2318754 | 10/1974 | Fed. Rep. of Germany . |
| 51-129500 | 11/1976 | Japan . |
| 54-154499 | 12/1979 | Japan . |
| 56-115313 | 9/1981 | Japan . |
| 57-119921 | 7/1982 | Japan . |
| 58-052319 | 3/1983 | Japan . |
| 62-141519 | 6/1987 | Japan . |

OTHER PUBLICATIONS

Kurihara et al., "Semipermeable membranes," *Chemical abstracts*, vol. 91, 1979, abstract No. 141839 w, pp. 42–43.

Primary Examiner—Robert E. Sellers
Attorney, Agent, or Firm—Ernest G. Szoke; Wayne C. Jaeschke; John E. Drach

[57] ABSTRACT

Curing agents for epoxy resins composed of (a) the reaction product of a co-reactant comprising either an epichlorohydrin (co) polymer or a (co)polymer of a chlorovinyl acetate, chloroalkyl acrylate with an organic amino compound containing at least one active hydrogen and having a $pK_B$ value within the range of from about 7 to about 9, preferably imidazole and substituted imidazoles; (b) an N-fatty imidazole and (a); (c) an N-fatty imidazole and an elastomeric polymer are disclosed. The curing agents are essentially water insoluble and give rise to epoxy resins which may be cured at relatively low temperatures below about 100° C. The epoxy resins are suitable for use as adhesives, coatings and in composite applications.

21 Claims, No Drawings

5,179,172

EPICHLOROHYDRIN OR CHLORINE-CONTAINING VINYL OR ACRYLATE (CO)POLYMER-MODIFIED AMINES

CROSS REFERENCE TO RELATED APPLICATIONS

This is application is a continuation-in-part of application Ser. No. 07/316,215 filed on Feb. 27, 1989 Which is a continuation-in-part of application Ser No. 07/254,520 filed on Oct. 06, 1988, both now abandoned.

BACKGROUND OF THE INVENTION

1. Field of the Invention

The present invention relates to modified amino compounds, preferably imidazole compounds, which are used as curing agents for epoxy resins, to methods of curing epoxy resins, and to cured epoxy resins produced by such methods.

2. Description of Related Art.

Epoxy resins are relatively low molecular weight linear polymers which may be cured (crosslinked) to form higher molecular weight thermoset resins useful in applications such as adhesives, abrasion resistant coatings, molding compounds and similar applications. Epoxy resins, such as the reaction product of bisphenol A and epichlorohydrin, may be cured by the reaction of a polyfunctional amine or alcohol with the terminal vicinal epoxide groups, or through the reaction of pendant hydroxyl groups present along the epoxy polymer chain with a polyfunctional acid or acid anhydride, resulting in the formation of ester linkages. Other materials containing active hydrogen atoms are also known curing agents for epoxy resins, such as polyamines, polyamide resins, phenolic, urea and melamine resins, and the like.

Amino compounds, such as imidazole compounds, are known in the art as curing agents for epoxy resins. Epoxy resins cured using certain imidazoles such as imidazole itself or alkyl substituted imidazoles are found to exhibit highly desirable physical and chemical properties. However, the water solubility of such compounds may result in the leaching out of unreacted imidazole (either during the process of curing or during final use) causing environmental problems.

One approach to improving the curing properties of imidazoles is to modify them by blending or reacting them with other materials. For example, U.S. Pat. No. 4,066,625 discloses a modified imidazole curing agent prepared by first reacting an imidazole compound with an epoxy resin, which reaction product is subsequently mixed with additional epoxy resin to form a crosslinked polymer system. However, the patent teaches that the resin must be heated to temperatures in excess of 100° C., for example 140° C. or 160° C., to effect a proper cure. Similarly, U.S. Pat. Nos. 4,358,571, 4,420,605 and European Patent 24119 teach imidazoles modified by the addition of a $C_1$ to $C_{18}$ alkyl acrylate, by an epoxy material or by carbamoylation, followed by neutralization, as curing agents for epoxy resins. Once again, however, relatively high curing temperatures well in excess of 100° C. are used to crosslink the epoxy resin. German patent document DE 2318754 teaches the preparation of fast curing epoxy resins (18-20 seconds at 180° C.) cured with modified imidazoles prepared by reacting an imidizole compound with an organic anhydride such as chlorendic anhydride or tetrahydrophthalic anhydride. Other patents disclosing similar modified imidazoles are Japanese patent document JP51-129,600 (imidazole modified by reaction with an isocyanate group) and Japanese patent document JP58-052,819 (imidazole modified by reaction with an epoxy compound and a copolymer obtained by polymerizing an alkenyl phenol and an alkene cyanide).

Yet another approach known in the art for preparing modified imidazole epoxy curing agents is to incorporate imidazole compounds into a non-epoxy polymeric backbone either by reaction with terminal functional groups present in the polymer or by copolymerization. For example, Japanese patent disclosure JP54-164,499 discloses epoxy curing agents prepared by the reaction of 2 moles of an imidizole compound with a carboxy terminated liquid rubber such as polybutadiene, ABN rubber, ABS rubber and similar materials. However, because the concentration of such end-capped curing agents is limited by the low concentration of end groups, auxiliary curing agents are often required to give a satisfactory cure. Japanese patent document JP 62-141,519 discloses a similar curing agent prepared by reacting a liquid ABN rubber end-capped with a compound which may include an amine having one or more active hydrogens. Other prior art references teach incorporating ethylenically unsaturated imidazole monomers, such as vinylimidazoles or imidazolyl methyl styrene, into polymeric backbones by copolymerizing the imidazole monomer with at least one other copolymerizable monomer. Such references include Japanese patent documents JP 56-115,313 and JP 57-119,921 and U.S. Pat. Nos. 4,349,651 and 4,430,445.

While the above approaches to providing curing agents for epoxy resins may be suitable for various applications, there exists an objective in the art to provide epoxy curing agents and epoxy resins cured using such agents which are curable at relatively low temperatures below about 100° C. For example, where the epoxy resins are used in applications such as liners or interior coatings for in-place pipes (water pipes, sewerage pipes and the like) it is most desirable to cure the resin within the damp pipe in-situ after it has been applied to the pipe interior. This may be readily accomplished by the passage of hot water through the pipe if the epoxy can be cured at the temperature of the water which is, of course, below 100° C., normally about 75° C.

It is also important in such applications that the epoxy curing agent not have a tendency to leach out of either from the uncured resin during the casting in a wet underground pipe, or from the cured epoxy during continual uses, for environmental purposes, that it be essentially water insoluble and that the cured resin possesses good mechanical properties such as tensile and flexural strength.

DESCRIPTION OF THE INVENTION

The above objectives have now been substantially achieved in accordance with the present invention by providing epoxy curing agents the first embodiment of which are the reaction products of an amino compound having at least one reactive hydrogen atom and having a basic dissociation constant ($pK_b$ value) within the range of from about 7 to about 9, with one of the following as defined by formula I and II:

I. An epichlorohydrin oligomer or elastomeric polymer or copolymer having recurring groups of the formula:

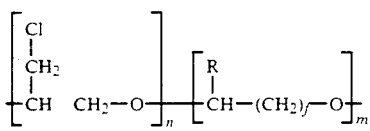

I wherein R is selected from the group consisting of hydrogen and a $C_1$ to $C_{18}$ alkyl group, n is an integer of from 5 to 200, m is an integer of from 0 to 200, and t is an integer of 1 to 3; or II. A chlorine-containing oligomer or elastomeric polymer or copolymer of an alkyl acrylate or methacrylate with a chloroethyl vinyl etheralpha-chlorovinyl acetate and 2-chloroethyl acrylate having recurring groups of the formula:

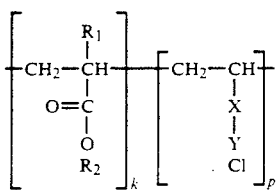

II wherein $R_1$ is hydrogen or methyl, $R_2$ is a $C_2$ to $C_{12}$ alkyl group; k is an integer of from 0 to 200, p is an integer of from 5 to 200, X is oxygen or a carboxyl group, and Y is an ethylene or methylene group.

The preferred amino compounds are those possessing at least one active hydrogen atom and those exhibiting a $pK_b$ value within the range of about 7.2 to about 8.8 and include heterocyclic amines such as imidazole compounds and morpholine; and hydroxy substituted amines such as hydroxy ethylmorpholine, diethanolamine, triethanolamine and N,N-diethylethanolamine; and derivatives thereof.

The most preferred amino compounds for the purposes of this invention are imidazole and substituted imidazoles having the formula

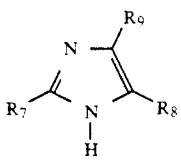

wherein $R_7$, $R_8$, and $R_9$ are independently selected from the group consisting of hydrogen, alkyl or cycloalkyl having from one to six carbon atoms, alkenyl, aryl, halogen and other non-interfering inert substituent groups. Such groups are those which do not interfere in the reaction of the amino compound with the compounds of formula I and/or II. Preferably $R_7$ is selected from the group consisting of hydrogen, alkyl, and phenyl; $R_9$ and $R_8$ are the same or different substituents selected from the group consisting of hydrogen and $C_1$ to $C_4$ alkyl. Most preferably, $R_8$ is hydrogen and $R_7$ and $R_9$ are independent or the same of hydrogen, methyl or ethyl. Preferred imidazoles for the purposes of this invention include imidazole, 2-methyl-4-ethyl imidazole and 2- methylimidazole.

The epichlorohydrin component of formula I which may be reacted with the amino compound to produce the curing agents of this invention include oligomeric and polymeric epichlorohydrin homopolymers, and copolymers of epichlorohydrin with alkylene oxides or cyclic ethers. The number average molecular weight of these materials may vary from about 465 in the case of an epichlorohydrin pentamer up to about 30,000 in the case of homopolymers or copolymers containing polymerized epichlorohydrin. It is most preferred for the purposes of this invention to employ homopolymers or copolymers of epichlorohydrin wherein n in formula I ranges from about 20 to 60 and m ranges from about 0 to 30, or 1 to 30 when the oxygen-containing comonomer is present, since these polymers exhibit elastomeric properties which tend to impart a degree of flexibility and improved elongation and tensile strength in the epoxy resins for which they are used as curing agents. The preferred number average molecular weight of such elastomers lies within the range of about 1,000 to about 10,000, with about 2000 to about 7500 being the most preferred. Polyepichlorohydrin and copolymers of epichlorohydrin with monomers corresponding to formula I wherein R is hydrogen, methyl or ethyl are most preferred, e.g., a copolymer of epichlorohydrin with ethylene oxide, propylene oxide, butylene oxide or tetrahydrofuran. The preferred molar ratio of epichlorohydin to oxygen containing comonomer ranges from about 2 to about 100 mole %, with about 30 to about 70 mole % being the most preferred level of epichlorohydrin.

The component of formula II which may be reacted with the amino compound to produce the curing agent of this invention may have a molecular weight within the range of about 465 up to about 30,000. Preferred polymers for the purposes of this invention are copolymers of formula II wherein k ranges from about 20 to 60 and p ranges from about 5 to 30. Such copolymers also exhibit elastomeric properties and offer the same consequent advantages in mechanical properties as the polymers containing epichlorohydrin referred to above. The preferred molecular weight of the polymers of formula II also ranges from about 1000 to about 10,000, with about 2000 to about 7500 being most preferred. Copolymers of ethyl acrylate or butyl acrylate with chloroethyl vinyl ether- alpha-chlorovinyl acetate and 2-chloroethyl acrylate are the most preferred species of elastomers falling within the scope of formula II. The preferred molar ratio of acrylate comonomer present in the formula II copolymer ranges from about 1 to about 99 mole %, with about 30 to about 70 mole X being the most preferred level of acrylate comonomer.

The curing agents of the first embodiment of the present invention may be prepared by forming a solution of the amino compound and the materials of formula I or II in organic solvents such as methylene chloride, toluene, xylene, secondary butanol, acetone, tetrahydrofuran, dimethylformamide or mixtures thereof and refluxing the mixture for a period of time sufficient to permit at least a portion of the amino compound to react with the formula I or II material, usually a period of from about 2 to about 6 hours. A base such as sodium or potassium hydroxide, triehtylamine, sodium methoxide or sodium hydride may be added to the solvent solution prior to reflux in order to catalyze the reaction. The resulting reaction product is then washed with water and the solvent removed by evaporation. The precise nature of the reaction is not known, but it is believed that an amination product is formed involving a displacement of the chlorine atom present in the formula I and II material. Where the non-amino component is at least trimeric, i.e., polymeric, the reaction product may be defined as a polymer having at least three amino compounds, or the preferred imidazole compounds, covalently grafted at random locations along the polymer chain.

The quantity of the amino compound which is reacted with the material of formula I or II may be within the range of about 3 to about 50% by weight, with about 15 to about 35% by weight being the preferred ratio. It is not essential that all of the amino compound be reacted, since any residual unreacted amino compound present in the curing agent will not interfere with, and may even favorably assist, the crosslinking of the epoxy resin.

A second embodiment of the curing agents of the present invention contain (a) the reaction product of an amino compound having at least one reactive hydrogen atom and having a basic dissociation constant with the range of from about 7 to about 9, with a coreactant having the following structure as defined by formula I or formula II: (b) at least one compound having the formula IV

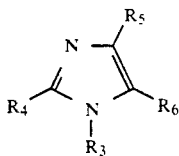

wherein $R_3$ is a linear or branched alkyl group having from 8 to 24 carbon atoms, $R_4$ is hydrogen, or a linear or branched alkyl group having from 1 to 24 carbon atoms, $R_5$ is hydrogen, or a linear or branched alkyl group having from 1 to 6 carbon atoms, and $R_6$ is hydrogen, or a linear or branched alkyl group having from 1 to 6 carbon atoms. The inclusion of a compound of formula IV into the curing agents of the first embodiment of the present invention results in an increase in the tensile strength, tensile modulus, flexural strength, and flexural modulus of the cured resin, and the rate of cure. The amount of a compound of formula IV that can be added to curing agents of the first embodiment of the present invention is a function of the desired physical properties of the cured resin. For example, the addition of greater amounts of a compound of formula IV results in greater tensile strengths and increased cure rates. The preferred amount of a compound of formula is from about 0.5% to about 90% by weight of the curing agent. The most preferred amount of a compound of formula is from about 50% to about 80% by weight of the curing agent. The preferred compound of formula IV is N-lauryl-2-methylimidazole (1-dodecyl-2-methylimidazole). A curing agent of the second embodiment of the present invention is made by simply adding a compound of formula IV is to a curing agent of the first embodiment of the present invention after and mixing the two together until a uniform mixture is obtained. No special incorporation techniques are required.

A third embodiment of the curing agents of the present invention contain an elastomeric polymer selected from the group consisting of polyepichlorohydrin, a copolymer of epichlorohydrin and tetrahydrofuran, a polyacrylic $C_3$–$C_6$ ester, a carboxyl-terminated butadiene-acrylonitrile copolymer, or an amine-terminated butadiene-acrylonitrile copolymer and at least one compound having the formula IV

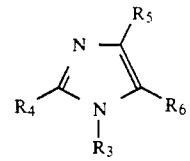

wherein $R_3$ is a linear or branched alkyl group having from 8 to 24 carbon atoms, $R_4$ is hydrogen, or a linear or branched alkyl group having from 1 to 24 carbon atoms, $R_5$ is hydrogen, or a linear or branched alkyl group having from 1 to 6 carbon atoms, and $R_6$ is hydrogen, or a linear or branched alkyl group having from 1 to 6 carbon atoms. The third embodiment of the curing agents of the present invention do not contain an amino compound having at least one reactive hydrogen atom (that is, a primary or secondary amine). In these cases, it is not necessary that an adduct be formed between an amino compound having at least one reactive hydrogen atom (that is, a primary or secondary amine) and having a basic dissociation constant of from about 7 to about 9 and an elastomeric polymer. In fact, such an adduct cannot be formed because the amino compound is a 1-substituted imidazole and has no reactive hydrogen atoms (that is, it is not a primary or secondary amine) and cannot therefore, react with the elastomeric polymer that has a pendent functionality capable of reaction with a primary or secondary amine. The preferred amount of a compound of formula IV is from about 0.5% to about 90% by weight of the curing agent. The most preferred amount of a compound of formula is from about 50% to about 80% by weight of the curing agent. The preferred compound of formula IV is N-lauryl-2-methylimidazole (1-dodecyl-2-methylimidazole). The preferred elastomeric polymers which can be used in the third embodiment of the present invention are polyepichlorohydrin, a copolymer of epichlorohydrin and tetrahydrofuran, a carboxyl-terminated butadiene-acrylonitrile copolymer, or an amine-terminated butadiene-acrylonitrile copolymer. The most preferred elastomer polymer is polyepichlorohydrin. The preferred number average molecular weight ranges of these elastomeric polymers is from about 1000 to about 15,000, with about 2000 to about 7,500 being most preferred. A curing agent of the third embodiment of the present invention is made by simply mixing the components together until a uniform mixture is obtained. No special incorporation techniques are required.

The curing agents of the present invention may be used for crosslinking of essentially any 1,2-polyepoxy resin. Suitable resins include the diglycidyl ethers of bis-phenols, particularly bisphenol A, and novolaks, having a weight per epoxy of at least about preferred group of polyglycidyl compounds are made via condensation reactions between 2,2-bis(4-hydroxyphenyl) propane and epichlorohydrin. These so-called bisphenol-A epoxy resins are available commercially under the trade names "Epon 828", "Epon 1001" and "Epon 1009" from Shell Chemical Company, and as "DER 331" and "DER 334" from Dow Chemical Company.

Other classes of epoxy resins which may be cured according to this invention include epoxidized esters of polyethylenically unsaturated monocarboxylic acids, epoxidized esters of unsaturated monohydric alcohols, epoxidized esters of unsaturated alcohols and unsaturated carboxylic acids, epoxidized derivatives of polyethylenically unsaturated polycarboxylic acids, epoxidized polyesters obtained by reacting an unsaturated polyhydric alcohol and an unsaturated polycarboxylic acid or anhydride, epoxidized polyethylenically unsaturated hydrocarbons, epoxidized polymers and copolymers of diolefins, glycidyl-containing nitrogen compounds such as diglycidyl aniline, silicone resins containing epoxy functionality, and copolymers of acrylic acid esters of glycidol with one or more copolymerizable vinyl compounds. The aforementioned epoxy resins may be used neat or may be admixed with up to about 35% by weight of a mono-epoxy reactive diluent. Examples of such mono-epoxides include butyl glycidyl ether, neodol glycidyl ether (Shell) or a $C_{12}$ to $C_{14}$ alkyl glycidyl ether.

Suitable epoxy resins useful for the present invention are more particularly described in U.S. Pat. Nos. 4,066,625 and 4,654,407, the disclosures of which are incorporated herein by reference.

To effect a cure, the curing agents of this invention may be mixed with the epoxy resin at a ratio of from about 2 to about 40 parts by weight of curing agent and about 60 to about 98 parts by weight epoxy resin. The particular ratio of mixing is a function of the content of the amino compound, i.e., the higher the content of amino compound present in the curing agent reaction adduct, the lower the content of the curing agent needed to effect a proper cure, and vice versa. The preferred level of addition of the curing agent ranges from about 15 to about 35 parts by weight per 65 to 85 parts by weight of epoxy resin Curing is effected by heating the mixture to a temperature and for a time sufficient for the desired crosslinking to take place. As indicated above, one of the advantages of the curing agent of this invention is that epoxy resins containing them may be controllably cured at temperatures below 100° C. For example, proper curing may be effected by heating the composition at a temperature of about 40° to about 85° C., more preferably at about 60° C. to about 70° C., for a period of about two to about six hours, more preferably for about four hours.

The suitability of using a particular embodiment of the curing agents of the present invention depends upon the particular properties desired in the cured epoxy resin. For example, a curing agent of the first embodiment of the present invention is particularly useful where the cured epoxy resin must not contain any water-leachable or unreacted curing agents. A curing agent of the second embodiment of the present invention is particularly useful where the cured epoxy resin must exhibit improved mechanical properties such as tensile strength, flexural strength, and elongation at break relative to a resin cured with a curing agent of the first embodiment of the present invention. A curing agent of the third embodiment of the present invention is particularly useful where the cured epoxy resin must exhibit improved mechanical properties such as tensile strength, flexural strength, and elongation at break relative to a resin cured with a curing agent of the first embodiment of the present invention and be lower in cost than the second embodiment of the curing agents of the present invention.

Other advantages of the curing agents of this invention are a relatively long pot life, for example 24 hours at 25° C., and the fact that, unlike other amino curing agents, they are essentially water insoluble, although they are capable of crosslinking in the presence of water. Thus, epoxy resins crosslinked with these curing agents are less susceptible to a leaching out or an extraction of unreacted curing agent. They also provide for a relatively mild and complete cure with a relatively low peak exotherm which is advantageous in applications where excessive degradation of the resin and heat are to be avoided.

The crosslinkable epoxy resins may be used in any application where such resins have been used in the past such as adhesives, coatings, particularly coatings for metals, electrical applications, molded articles, and composite applications. They may be mixed with fillers or fibers for use as binder resins in the production of composites.

The following Examples 1–9 are illustrative of the preparation of curing agents of the present invention.

EXAMPLE 1

79 grams of polyepichlorohydrin of molecular weight equal to about 3,000–4,000 (Hydrin 10X1, a trademark of B. F. Goodrich) and 21 grams of 2-methyl-4-ethylimidazole were refluxed in 100 ml of toluene for a period of about 4 hours. The solution was washed with sodium bicarbonate and water, and the solvent was removed by vacuum. The viscous liquid was characterized by NMR to be the imidazole-polyepichlorohydrin adduct.

EXAMPLE 2

The procedure of Example 1 was repeated, except the weight ratio of 2-methyl-4-ethylimidazole to polyepichlorohydrin was changed to 35/65.

EXAMPLE 3

The procedure of Example 1 was repeated, except the weight ratio of 2-methyl-4-ethylimidazole to polyepichlorohydrin was changed to 16/84.

EXAMPLE 4

41 grams of 2-methylimidazole and 22 grams of powdered NaOH were dissolved in a mixture of 100 ml of secondary butanol and 100 ml of toluene at 100° C. 186 grams of polyepichlorohydrin in 100 ml of toluene was added and the reflux was continued for 4 hours. After water wash, drying and solvent removal, the product was characterized as an adduct containing 2-methylimidazole grafted onto polyepichlorohydrin.

EXAMPLE 5

The procedure of Example 4 was repeated, except that imidazole was used to replace 2-methylimidazole.

EXAMPLE 6

The procedure of Example 1 was repeated, except epichlorohydrin monomer was used instead of the polymer in the reaction with 2-methyl-4-ethylimidazole.

EXAMPLE 7

The procedure of Example 4 was repeated, except that hydroxymethylmorpholine was used to replace the 2-methylimidazole.

EXAMPLE 8

The procedure of Example 1 was repeated, except a copolymer of epichlorohydrin and tetrahydrofuran (30/70 in molar ratio) was used to replace polyepichlorohydrin.

EXAMPLE 9

The procedure of Example 1 was repeated, except a copolymer of butyl acrylate and chloroethyl vinyl ether (80/20 in molar ratio) was used to replace polyepichlorohydrin.

The following examples 10-18 illustrate the preparation of cured epoxy resins made using the curing agents of the present invention.

EXAMPLE 10

About 23 parts by weight of the imidazole-elastomer adduct of Example 1, which contains 18 parts of elastomer and about 5 parts of 2-methyl-4-ethylimidazole, was added to 77 parts by weight of epoxy Epon 828 (Shell) followed by good mechanical mixing. The initial viscosity of this mixture was 190 poise. It was not soluble in water, and after 17 hours the viscosity reached 3000 poise, still a workable fluid suitable for casting 200 grams of this resin was cured at 140° F. (60° C.) in a cylindrical 250 cc beaker to give a peak exotherm of only 210° F. This viscous product was casted at 73° C. for 4 hours to give a ¼" thick transparent properties are shown in Table I, column 1.

EXAMPLE 11

The procedure of Example 10 was repeated, except 14 parts of the imidazole-elastomer adduct from Example 2, which contains 9 parts of elastomer and about 5 parts of 2-methyl-4-ethylimidazole, was mixed with 86 parts of Epon 828. It was cured as described in Example 10. Physical properties are shown in Table I, column 2.

EXAMPLE 12

The procedure of Example 10 was repeated, except 33 parts of imidazole-elastomer adduct from Example 3, which contains about 28 parts of elastomer and about 5 parts of 2-methyl-4-ethyl-imidazole, was mixed with 67 parts of Epon 828. It was cured as described above and physical properties are shown in Table I, column 3. The Barcol hardness was noticeably lower. The sheet was non-transparent indicating phase separation. This is indicative of the fact that insufficient 2-methyl-4-ethyl-imidazole is present in the adduct to effect a proper cure.

EXAMPLE 13

The procedure of Example 10 was repeated, except the resin was cured at 83° C. for 4 hours. The physical properties are shown in Table I, column 4.

EXAMPLE 14

The procedure of Example 10 was repeated, except that the 23 parts by weight of the imidazole elastomer adduct of Example 4 containing 2-methyl imidazole was used instead of the 2-methyl-4-ethylimidazole adduct. The viscous reaction product was cast at about 73° C. for 4 hours to give a ¼" thick transparent sheet. Physical properties are shown in Table 1, column 5.

EXAMPLE 15

The procedure of Example 10 was repeated, except that the Epon 828 was thinned with 13 wt. % of butyl glycidyl ether (67 parts Epon 828 and 10 parts of butyl glycidyl ether). The viscosity was 30 poise. After 17 hours, the viscosity had increased to only 120 poise. This product is especially suitable as a binder resin for polyester felt mats in the production of molded composites.

EXAMPLE 16

About 10 parts by weight of N-lauryl-2-methylimidazole and 6.3 parts of the imidazole-elastomer adduct of Example 4 which contains 4.9 parts of elastomer and about 1.4 parts of 2-methylimidazole, were added to 83.7 parts by weight of epoxy Epon 828 (Shell) followed by good mechanical mixing. The initial viscosity of this mixture was 250 poise, still a workable fluid suitable for coating. The mixture was then casted at 73° C. for 4 hours to give a ¼" thick transparent sheet. Physical properties of the cured resin are shown in Table 1, column 6.

EXAMPLE 17

About 5.1 parts by weight of Hydrin 10X1 rubber and 11.4 parts by weight of N-lauryl-2-methylimidazole were added to 83.5 parts by weight of epoxy Epon 828 (Shell) followed by good mechanical mixing. The initial viscosity of this mixture was 42 poise. The mixture was then casted at 73° C. for 4 hours to give a ¼" thick transparent sheet. Physical properties of the cured resin are shown in Table 1, column 7.

EXAMPLE 18

About 12.9 parts by weight of N-lauryl-2-methylimidazole were added to 87.1 parts by weight of epoxy Epon 828 (Shell) followed by good mechanical mixing. The initial viscosity of this mixture was 33 poise. The mixture was then casted at 73° C. for 4 hours to give a ¼" thick transparent sheet. Physical properties of the cured resin are shown in Table 1, column 8.

COMPARATIVE EXAMPLE 16

The procedure of Example 10 was repeated, except that the curing agent employed comprised 18 parts by weight of epichlorohydrin monomer and 5 parts by weight of imidazole which had not been pre-reacted in accordance with the present invention. After shaking with water several times, the resulting resin failed to cure under the conditions listed.

COMPARATIVE EXAMPLE 17

The procedure of Example 10 was repeated, except that the sole curing agent employed was 5 parts by weight of 2-methyl-4-ethylimidazole alone without the presence of the polyepichlorohydrin elastomer. The 200 gram mass peak exotherm test showed that the resulting epoxy resin composition charred under heating conditions as set forth in Example 9, due to an uncontrollable exotherm. It is to be understood that the above described embodiments of the invention are illustrative only and that modifications throughout may occur to those skilled in the art.

What is claimed is:

1. An curing agent comprising the reaction product of an imidazole compound having at least one reactive hydrogen atom and having a basic dissociation constant $pK_b$ value within the range of from about 7 to about 9, with a co-reactant having the following structure as defined by formula I or formula II:
    I. An epichlorohydrin oligomer or elastomeric polymer or copolymer having recurring groups of the formula:

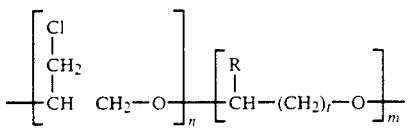

wherein R is selected from the group consisting of hydrogen and a $C_1$ to $C_{18}$ alkyl group, n is an integer of from 5 to 200, m is an integer of from 0 to 200, and t is an integer of from 1 to 3; or II. A chlorine-containing oligomer or elastomeric polymer or copolymer of an alkyl acrylate or methacrylate with a chlorovinyl acetate, chloroalkyl vinylether or chloroalkyl acrylate having recurring groups of the formula:

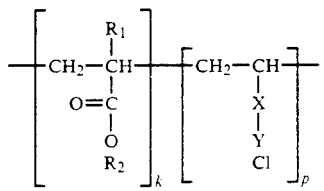

wherein $R_1$ is hydrogen or methyl, $R_2$ is a $C_2$ to $C_{12}$ alkyl group; k is an integer of from 0 to 200, p is an integer of from 5 to 200, X is oxygen or a carboxyl group, and Y is an ethylene or methylene group.

2. The curing agent of claim 1 further comprising at least one compound of the formula IV

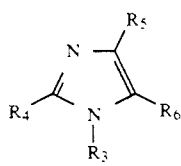

wherein $R_3$ is a linear or branched alkyl group having from 8 to 24 carbon atoms, $R_4$ is hydrogen, or a linear or branched alkyl group having from 1 to 24 carbon atoms, $R_5$ is hydrogen, or a linear or branched alkyl group having from 1 to 6 carbon atoms, and $R_6$ is hydrogen, or a linear or branched alkyl group having from 1 to 6 carbon atoms.

3. The curing agent of claim 1 wherein said amino compound is an imidazole or a substituted imidazole having the formula:

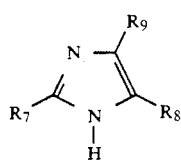

wherein $R_7$, $R_8$, and $R_9$ are independently selected from the group consisting of hydrogen, alkyl or cycloalkyl having from one to six carbon atoms, alkenyl, aryl, halogen and other non-interfering inert substituent groups.

4. The curing agent of claim 3 wherein said co-reactant has the structure of formula I.

5. The curing agent of claim 4 wherein n ranges from about 20 to about 60 and m ranges from about 0 to about 30.

6. The curing agent of claim 5 wherein m is at least one.

7. The curing agent of claim 4 wherein said co-reactant is an elastomeric polyepichlorohydrin.

8. The curing agent of claim 4 wherein said co-reactant is an elastomeric copolymer of epichlorohydrin and an alkylene oxide.

9. The curing agent of claim 4 wherein said co-reactant is an elastomeric copolymer of epichlorohydrin and tetrahydrofuran.

10. The curing agent of claim 4 wherein said co-reactant has a number average molecular weight within the range of about 2000 to about 7500.

11. The curing agent of claim 4 wherein $R_7$ is selected from the group consisting of hydrogen, $C_1$ to $C_4$ alkyl, and phenyl.

12. The curing agent of claim 11 wherein $R_9$ and $R_8$ are the same or different substituents selected from the group consisting of hydrogen and $C_1$ to $C_4$ alkyl.

13. The curing agent of claim 12 wherein said imidazole compound is selected from the group consisting of imidazole, 2-methyl-4-ethyl imidazole and 2-methylimidazole.

14. The curing agent of claim 1 wherein said co-reactant has the structure of formula II.

15. The curing agent of claim 14 wherein n ranges from about 20 to about 60 and p ranges from about 1 to about 30.

16. The curing agent of claim 14 wherein said co-reactant is a copolymer of ethyl or butyl acrylate with a comonomer selected from the group consisting of chloroethyl vinyl ether, alpha-chlorovinyl acetate and 2-chloroethyl acrylate.

17. The curing agent of claim 14 wherein X is selected from the group consisting of hydrogen, $C_1$ to $C_4$ alkyl, and phenyl.

18. The curing agent of claim 17 wherein Y and Z are the same or different substituents selected from the group consisting of hydrogen and $C_1$ to $C_4$ alkyl.

19. The curing agent of claim 3 wherein said imidazole compound is selected from the group consisting of imidazole, 2-methyl-4-ethyl imidazole and 2-methylimidazole.

20. The curing agent of claim 4 wherein said amino compound is reacted with said co-reactant at a level of from about 15 to about 50% by weight.

21. The curing agent of claim 14 wherein said imidazole compound is reacted with said co-reactant at a level of from about 15 to about 50% by weight.

* * * * *